(12) United States Patent
Best

(10) Patent No.: US 7,744,982 B2
(45) Date of Patent: Jun. 29, 2010

(54) EDGE INSULATION FOR VACUUM INSULATION PANELS

(76) Inventor: Frederick G. Best, Energy International Systems Ltd, 216 Desborough Avenue, High Wycombe, Bucks HP11 2TN (GB)

( * ) Notice: Subject to any disclaimer, the term of this patent is extended or adjusted under 35 U.S.C. 154(b) by 0 days.

(21) Appl. No.: 10/381,931

(22) PCT Filed: Sep. 27, 2001

(86) PCT No.: PCT/GB01/04309

§ 371 (c)(1), (2), (4) Date: Aug. 14, 2003

(87) PCT Pub. No.: WO02/27111

PCT Pub. Date: Apr. 4, 2002

(65) Prior Publication Data

US 2004/0018335 A1 Jan. 29, 2004

(30) Foreign Application Priority Data

Sep. 27, 2000 (GB) .................. 0023639.8
Apr. 5, 2001 (GB) .................. 0108535.6

(51) Int. Cl.
*B32B 1/00* (2006.01)
*E06B 3/00* (2006.01)

(52) U.S. Cl. .................. 428/174; 428/34; 428/179; 428/181

(58) Field of Classification Search .................. 428/34, 428/35.1, 69, 68, 76, 174, 192, 122, 120, 428/121, 124, 128, 130, 125, 179, 181; 52/786.13
See application file for complete search history.

(56) References Cited

U.S. PATENT DOCUMENTS 2,589,064 A 3/1952 Drake et al.
2,840,500 A * 6/1958 Okoomian et al. .......... 428/184
3,916,048 A * 10/1975 Walles ...................... 428/35.9

(Continued)

FOREIGN PATENT DOCUMENTS

DE 1 076 551 2/1960

(Continued)

*Primary Examiner*—Alicia Chevalier
(74) *Attorney, Agent, or Firm*—DLA Piper LLP (US)

(57) ABSTRACT

The invention provides an edge insulation piece (1) comprising a thin sheet of material (2) which is manipulated by bending, rolling or other forming to effect a long conductive path within a small cross-sectional area. In a preferred embodiment, a thin layer of insulation material (3) is interleaved between two layers of the thin sheet of material (2), which is folded around the insulation layer (3) during forming of the edge piece (1). A further layer of insulation material (4) may be rolled within the edge piece (1) as it is. This interleaving of thin layers of insulation material (3, 4) prevents the surfaces of the thin sheet of material (2) from touching each other and also insulates the material (2) from the top and bottom panels (5, 6) of a vacuum insulation panel (7) when the edge piece (1) is inserted around the edge of the panel (7). The edge piece (1) may be further coated over part or all of its length with a low emissivity material (13) to minimise radiative losses. Alternatively or additionally the coating (13) may comprise a gas impermeable layer to form a gas impermeable barrier.

20 Claims, 5 Drawing Sheets

U.S. PATENT DOCUMENTS

| | | | | |
|---|---|---|---|---|
| 4,745,015 A | * | 5/1988 | Cheng et al. | 428/35.8 |
| 5,290,611 A | * | 3/1994 | Taylor | 428/34 |

FOREIGN PATENT DOCUMENTS

| DE | 19803908 | | 2/1998 |
|---|---|---|---|
| DE | 19803908 A1 | * | 8/1999 |
| FR | 2 525 314 | | 10/1983 |
| FR | 2525314 A | * | 10/1983 |
| JP | 2000055481 A | | 8/1998 |
| JP | 11100659 | | 4/1999 |

* cited by examiner

EDGE INSULATION FOR VACUUM INSULATION PANELS

This application is a national phase of International Application No. PCT/GB01104309 filed Sep. 27, 2003 and published in the English language.

The invention relates to edge insulation, principally but not exclusively for vacuum insulation panels.

In recent years the need for thermal super insulation materials having a thermal conductivity of less than 5 mW/mK has increased substantially. Vacuum insulation panels comprising two walls with an evacuated chamber between them have many advantages as insulation materials. In particular, vacuum super insulation (VSI) panels provide good insulation for many applications. With good quality VSI panels, the only losses normally encountered are radiative and conductive losses. For large panels having a large surface area, edge considerations form only a small part of the overall loss and tend to be ignored. However, where smaller areas are concerned i.e. 2 $m^2$ and less, edge losses can represent a significant part of the overall losses. Most Vacuum Super Insulation panels incorporate radiation inhibitors within the insulation material substrate and rely on fine powder and fibres to minimise conductive paths. For high temperature applications metal edges have to be used and the insulation materials are difficult to encapsulate within the edge formation and this increases the losses from the edge. Similarly, in order to be effective the edge material has to be as thin as possible and not create conductive paths between the exterior plates of the panel, as well as being as long as possible without making contact with itself. U.S. Pat. Nos. 4,745,015 and 4,444,821 disclose the use of plastic edges coated in thin metal to provide an adequate seal and others use plastic foil to achieve the same effect. Most plastic solutions have to limit temperatures to below 120° C., to avoid problems with shrinkage etc.

It is an object of the present invention to provide an edge insulation that will reduce the losses from encapsulated insulating materials, such as vacuum insulating panels, and any other device, component or part that requires a thermal break. The invention can be applied to effect an improvement at any temperature difference but it is particularly effective at elevated temperatures.

It is a further object of the present invention to provide an edge insulation with improved corner portions.

The invention provides an edge insulation piece for an insulation article characterised in that the edge insulation piece comprises a thin sheet of material, the thin sheet of material having been manipulated to effect a long conductive path within a small cross-sectional area.

Preferably the thin sheet of material may be any suitable width, from a narrow strip to a width suitable for making a long edge piece such as could form a one-piece edge insulation around an insulation panel, for example.

This invention improves the thermal performance of most Vacuum Super Insulation (VSI) panels and reduces the thermal losses normally encountered at the edges and circumferences of insulating materials. It achieves this improvement by increasing the conductive length of the material between the hot and cold surfaces. A variation also incorporates thin layers of insulation sandwiched between each fold or bend in the material. This is achieved without increasing the width by any significant amount and also reduces any convective losses due to the lower average temperature of the edge. The temperature drops along the length of the sheet forming the edge piece between a hot surface and a cold surface to which the edge piece may be attached. The invention further enables the edge of such insulating materials to be able to withstand thermal expansion and additionally creates a structurally strong edge.

Preferred materials include for example stainless steel for high temperature applications, aluminium foil, mild steel, glass or plastics materials which can withstand the required temperatures and pressures and are sufficiently gas impermeable for the required applications, either by treatment of the material or by coating it with a gas-impermeable layer. Potentially any material that is capable of being produced in a thin section is capable of being utilised. Ideally the lower the thermal conductivity the better, but even conductive materials can be used if they are thin enough and long enough.

Preferably the thin sheet of material is manipulated by bending, shaping or otherwise deforming the thin sheet of material.

Alternatively manipulation of the thin sheet of material may include forming the edge insulation piece by extruding, moulding or casting to produce the thin sheet of material in the desired configuration.

Preferably the thin sheet of material is manipulated to form an edge insulation piece having a substantially square or circular cross-section with the cross-section of the sheet of material being in the form of a spiral. Alternatively the cross-section of the edge insulation piece may be partly in the form of a wave or zigzag shape.

Preferably part or all of the surfaces of the thin sheet of material are coated with a low emissivity material.

Preferably the thin sheet of material is formed by rolling, stretching or any suitable method and this is coated with a gas-impermeable layer and/or a low emissivity layer or other desired layer by way of extrusion, electro-deposition and so on.

Preferably a thin layer of insulation material is sandwiched between layers of the thin sheet of material to improve the insulation between each layer and to prevent contact of any part of the thin sheet of material with adjacent layers.

Preferably the insulation is formed by a thin coating deposited, coated or otherwise joined to the thin sheet of material prior to manipulation of the thin sheet of material.

Alternatively the insulation may be formed by coating the thin sheet of material after manipulation, for example by immersion in a liquid insulation material, electro-deposition, powder coating, electro-static coating and so on.

Preferably the insulation is variable in thickness depending upon its relationship to the hot and cold surfaces of the insulation article.

Preferably the edge insulation piece is formed by folding or rolling the thin sheet of material. Advantageously the thin sheet is folded to form two adjacent layers, connected at the fold end. Preferably the folded sheet is folded or rolled to form the edge insulation piece. Preferably a layer of insulation material is sandwiched between the two layers of the folded sheet. Advantageously a further layer of insulation material is positioned adjacent to one of the layers of the folded sheet and is folded or rolled within the layers of the folded or rolled edge insulation piece.

Preferably the shaped edge insulation piece is squashed to limit its overall size.

Preferably the edge insulation piece has means to join it to separated parts of an article, such as the top and bottom parts, that requires having its parts insulated from each other, such as a panel. Advantageously the means to join the edge insulation piece to an article comprise extending end portions that can be attached to the respective separated parts of such an article by welding, adhesive means or other suitable means.

Preferably the extended end portions can be manipulated and shaped to achieve an effective seal.

Preferably the extended end portions are covered with an inverted 'V' or 'top hat' shaped sealing means to facilitate sealing by means of welding, gluing or alternative methods of sealing.

Preferably the thin material is manipulated by way of a series of rollers positioned in relation to each other to effect gradual changes without significant deformation of the material. Alternatively guides may be used to achieve a gradual change in form and shape. Alternatively the material may be manipulated by a combination of guides and rollers.

A further problem of using any type of edge assembly is the sealing of the corners. The invention further provides an edge insulation piece comprising a corner portion, the edge insulation piece comprising a thin sheet of material with extending portions corresponding to the corner portion and the thin sheet of material being manipulated to effect a long conductive path within a small cross-sectional area. Preferably the extending portions are triangular in shape. The manipulation of the corner portion can be accommodated using the same techniques of bending and folding as for the edge insulation piece. Preferably the manipulated corner portion comprises a radiused rolled corner. Most corner shapes can be accommodated using these folding techniques. It is feasible that these folding techniques may have applications in other technologies.

The invention further provides a method of manufacturing an edge insulation piece having a corner portion for an insulation article comprising the steps of:

providing a thin sheet of material with extending portions corresponding to the corner portion;

folding the thin sheet of material to form two layers; and manipulating the thin sheet of material to effect a long conductive path within a small cross-sectional area.

Preferably the step of manipulating the thin sheet of material comprises bending, shaping or otherwise deforming the thin sheet of material.

Alternatively the step of manipulating the thin sheet of material comprises forming the edge insulation piece by extruding, moulding or casting to produce the thin sheet of material in the desired configuration.

Preferably the step of manipulating the thin sheet of material comprises manipulating it to form an edge insulation piece having a substantially square or circular cross-section with the cross-section of the sheet of material being in the form of a spiral. Alternatively the cross-section of the edge insulation piece may be in the form of a wave or zigzag shape.

Preferably the method includes the further step of coating part or all of the surfaces of the thin sheet of material with a low emissivity material. The invention may alternatively or additionally provide the step of coating part or all of the surfaces of the thin sheet of material with a thin layer of gas impermeable material to provide an impermeable gas barrier should this be required.

Preferably the method includes the further step of sandwiching a thin layer of insulation material between layers of the thin sheet of material to improve the insulation between each layer and to prevent contact of any part of the thin sheet of material with adjacent layers. The invention may alternatively or additionally provide the step of sandwiching a thin layer of gas impermeable material between layers of the thin sheet of material to provide an impermeable gas barrier should this be required.

Preferably the insulation is formed by depositing, coating or otherwise joining a thin coating to the thin sheet of material prior to manipulation of the thin sheet of material.

Alternatively the insulation may be formed by coating the thin sheet of material after manipulation, for example by immersion in a liquid insulation material, electro-deposition, powder coating, electro-static coating and so on.

Preferably the edge insulation piece is formed by folding or rolling the thin sheet of material. Advantageously the thin sheet is folded to form two adjacent layers, connected at the fold end. Preferably the folded sheet is then folded or rolled to form the edge insulation piece. Preferably a layer of insulation material is sandwiched between the two layers of the folded sheet. Advantageously a further layer of insulation material is positioned adjacent to one of the layers of the folded sheet and is folded or rolled within the layers of the folded or rolled edge insulation piece.

Preferably the method includes the further step of squashing the shaped edge insulation piece to limit its overall size.

Preferably the manipulation of the thin sheet of material is carried out by a series of rollers positioned in relation to each other to effect gradual changes without significant deformation of the material. Alternatively guides may be used to achieve a gradual change in form and shape. Alternatively the material may be manipulated by a combination of guides and rollers. In a further alternative the material may be manipulated by twisting it.

The invention will now be described by way of example only with reference to the accompanying drawings, of which:

FIG. 1b shows a schematic enlargement of the circled area of FIG. 1a;

Figure 1A:
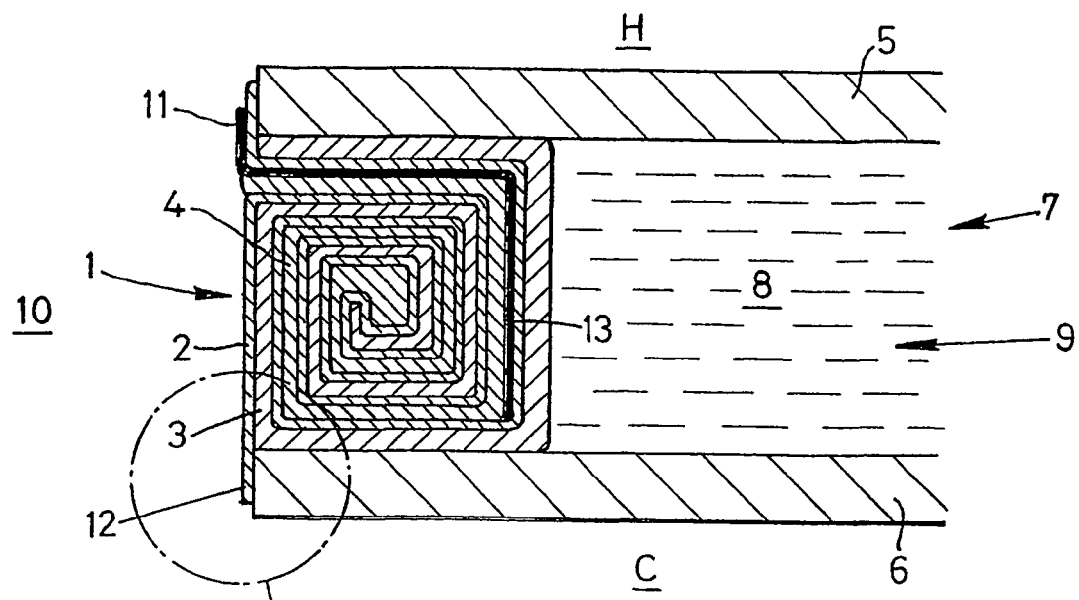
FIG. 1a shows a schematic cross-section of an edge insulation piece according to the invention arranged within a vacuum insulation panel.
Figure 1B:
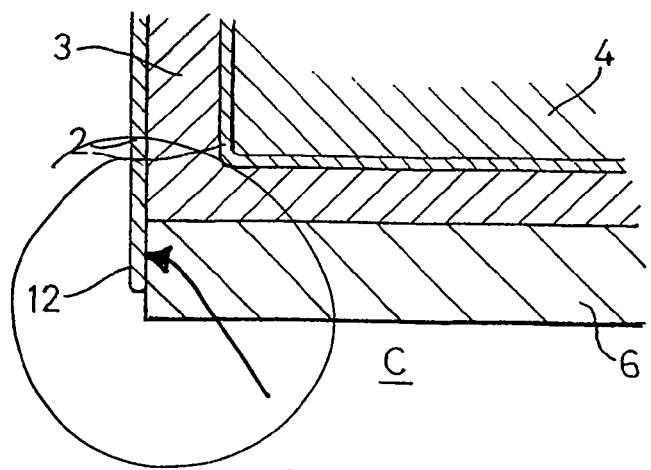
Figure 1C:
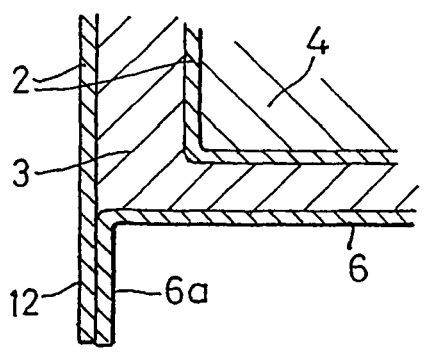
Figure 2A:
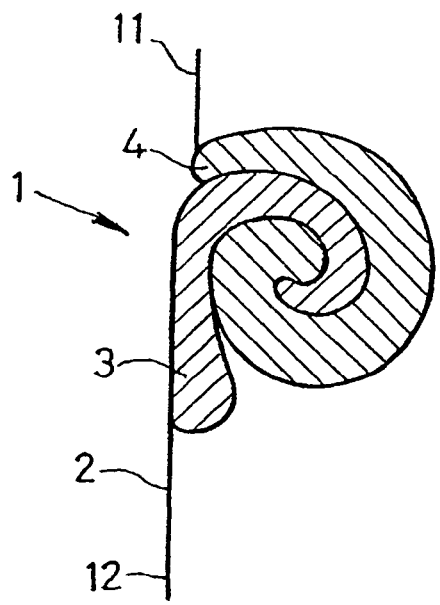
Figure 2B:
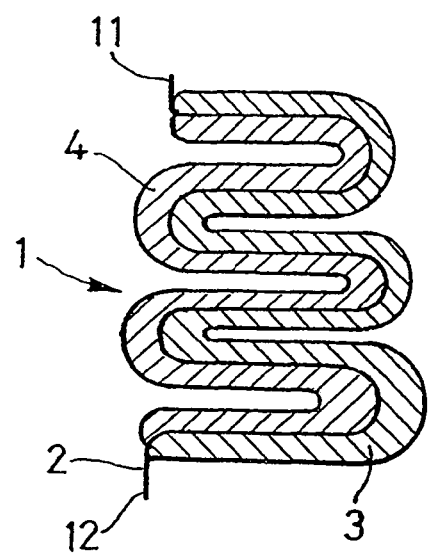
Figure 2C:
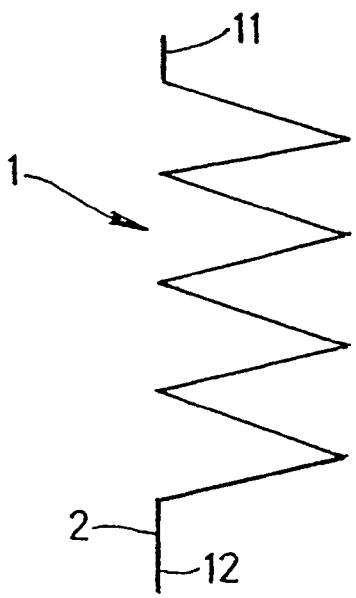
Figure 2D:
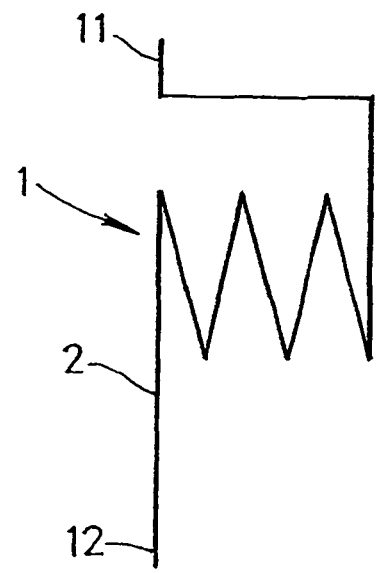
Figure 3A:
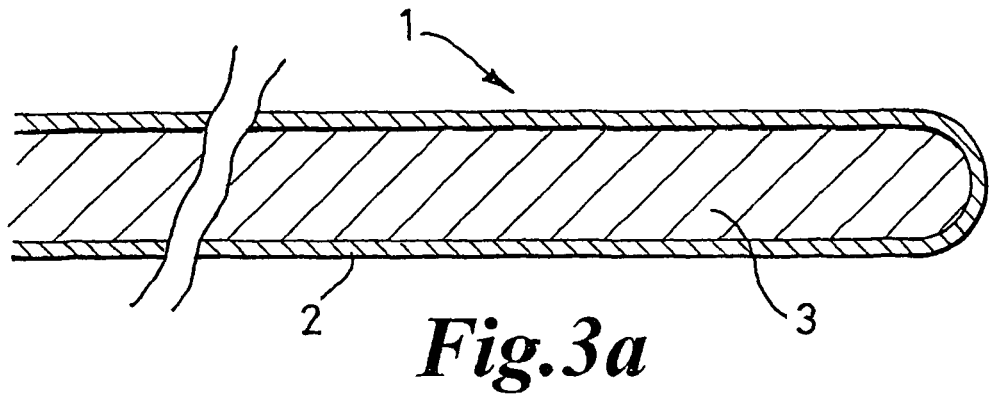
Figure 3B:
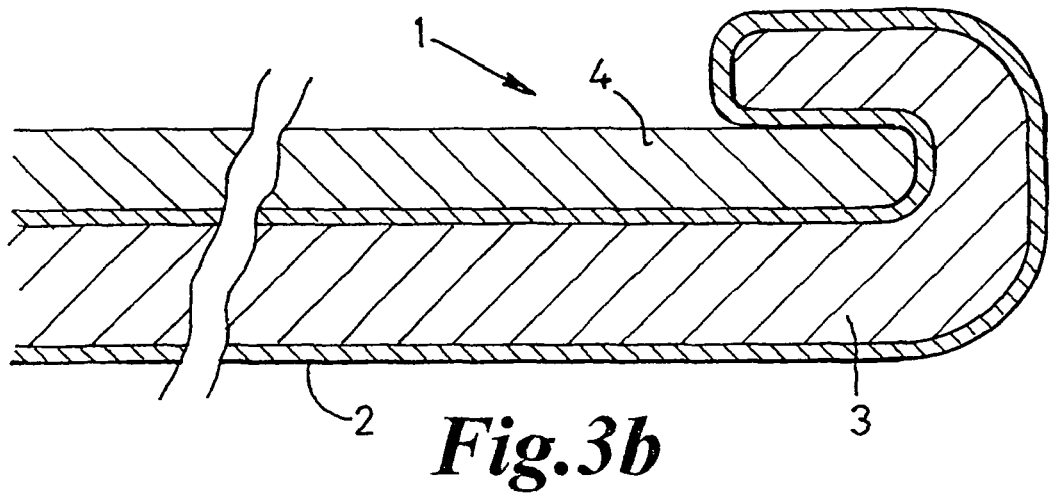
Figure 3C:
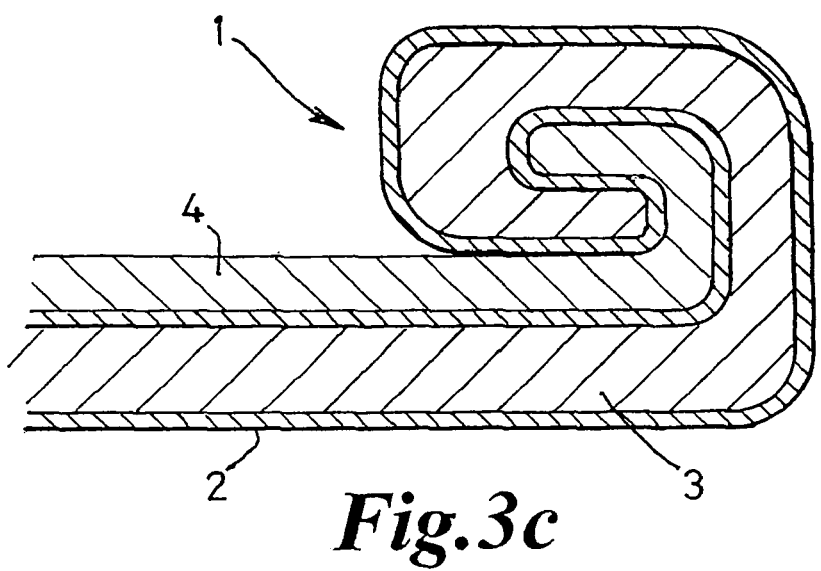
Figure 4:
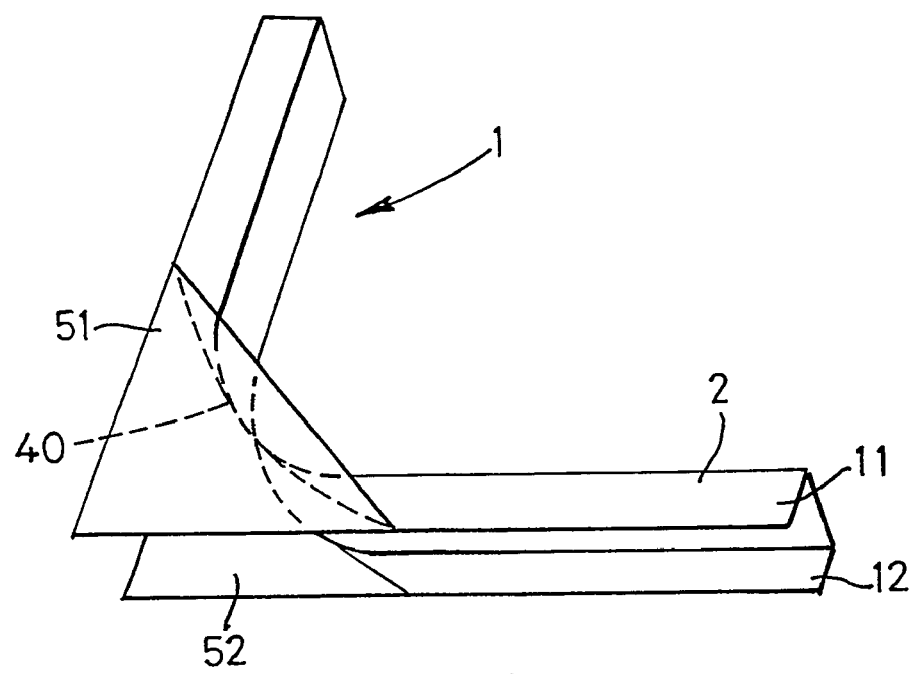
Figure 5:
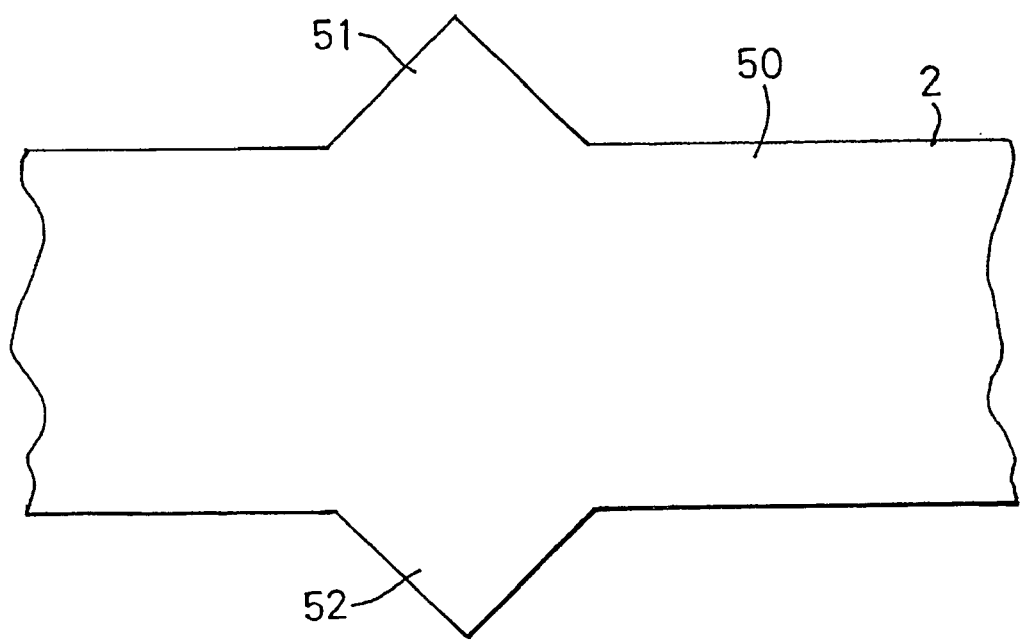

FIG. 1c,d,e,f and g show alternative embodiments of the area of the edge insulation piece shown in FIG. 1b;

FIG. 2a and d show alternative embodiments of the invention in schematic cross-section views;

FIGS. 2b and 2c show schematic cross-section views of structure of the prior art;

FIG. 3a,b,c show schematic cross-section views of the stages of manipulation of an edge insulation piece according to the invention;

FIG. 4 shows a schematic perspective view of a corner portion of a further embodiment of an edge insulation piece; and FIG. 5 shows a schematic plan view of the corner portion of FIG. 4 before the material is folded.

As shown in the Figures, an edge insulation piece 1 according to the invention comprises a thin sheet of material 2 which is manipulated by bending, rolling or other forming. In one embodiment, a thin layer of insulation material 3 is interleaved between the two layers of the thin sheet of material 2, which are folded around the insulation layer 3 during forming of the edge piece 1. A further layer of insulation material 4 may be rolled within the edge piece 1 as it is formed (as shown in FIG. 3a,b and c). This interleaving of thin layers of insulation material 3,4 prevents the surfaces of the thin sheet of material 2 from touching each other and also helps to insulate the material 2 from the top and bottom panels 5,6 of a vacuum insulation panel 7 when the edge piece 1 is inserted around the edge of the panel 7. The edge piece 1 may contact the internal insulation material 8 in the interior 9 of the panel 7. In the embodiments illustrated, the interior 9 of the panel 7 is held under a vacuum and thus the layer of insulation material 3 is also subject to the vacuum, with the other layer 4 being open to the atmosphere 10. The layer 4 is also subject to significant compression due to the folding processes employed in forming the edge insulation piece 1.

The edge piece 1 is attached to the top and bottom panels 5,6 by suitable means such as welding or adhesive means. The panel 5 has a hot face H and the panel 6 has a cold face C and the edge insulation piece 1 serves to reduce the transference of heat across the edge region of the whole panel 7. The edge piece 1 may be formed as a continuous edging for arrangement around the edges of the panel 7 such that when the edge insulation piece 1 is positioned around the circumference of the panel 7, the end faces of the edging piece 1 will meet together and can be welded or joined together to make a complete seal around the periphery of the panel 7.

As shown in FIGS. 1*a* and 1*b*, the ends 11,12 of the edge piece 1, which are extensions of the sheet 2, may be attached to the end faces of the panels 5,6. Alternative arrangements are shown in FIG. 1*c,d,e,f* and *g*. In these embodiments, the panels 5 and 6 are formed from thin sheets and the ends 5*a*,6*a* of the panels 5,6 are folded perpendicularly to the face of the panels 5,6 to form flanges. The ends 11,12 of the edge piece 1 may be attached to these flanges 5*a*,6*a*.

Figure 1D:
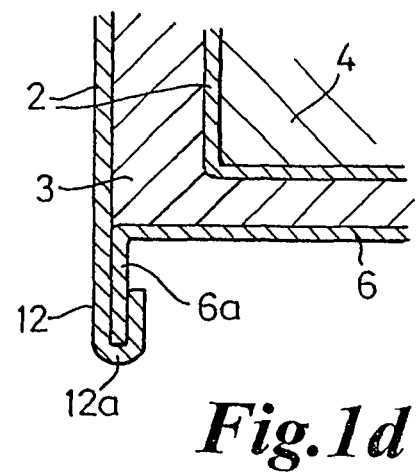
Figure 1E:
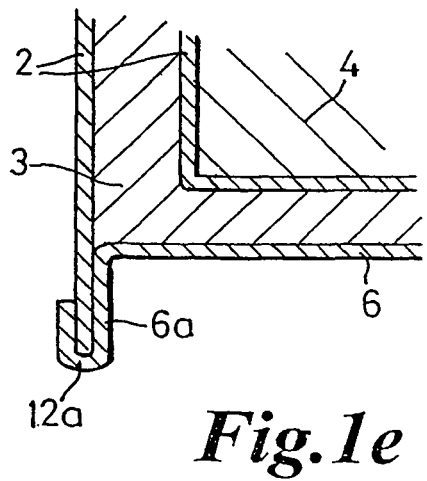
Figure 1F:
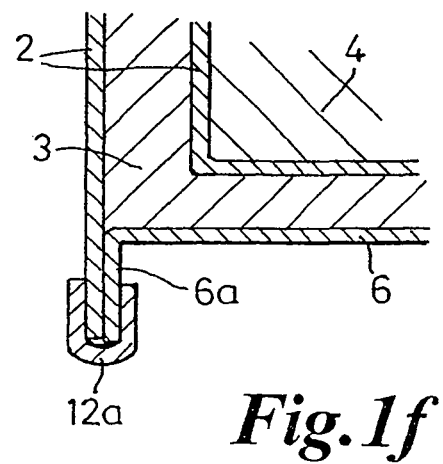
Figure 1G:
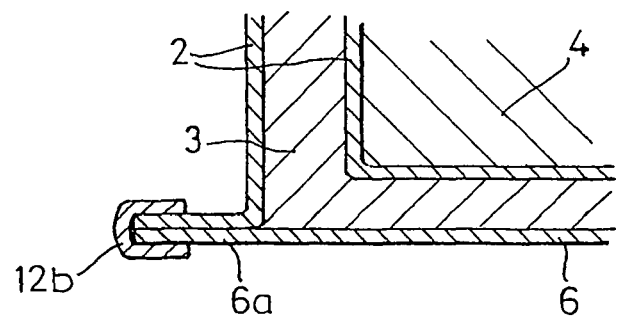

As shown in FIG. 1*d,e,f* and *g*, the ends of the end pieces 11,12 may be capped by inverted 'V' shapes or 'top hat' shapes 11*a*,12*a* to improve the seal. These may be formed as extensions of the end pieces 11,12 (FIG. 1*d*), as extensions of the flanges 5*a*,6*a* (FIG. 1*e*) or as separate pieces 11*b*,12*b* (FIGS. 1*f* and 1*g*).

The end pieces 11,12 and flanges 5*a*,6*a* may also be folded flat against the other faces of the panels 5,6 or sheet 2 to reduce the risk of damage to the edge sealing around the panel 7, provided that this does not compromise the insulation.

The edge piece 1 may be further coated over part or all of its length with a low emissivity material 13 to minimise radiative losses. This layer 13 is preferably formed on the face of the sheet 2 that is directed towards the atmosphere 10, so that radiation losses to the atmosphere are reduced. Alternatively or additionally this further coating 13 may comprise a gas impermeable layer to form a gas impermeable barrier.

Some of the possible alternative configurations of the edge piece 1 are shown schematically in FIGS. 2*a* and *d*. FIG. 2*a* shows an embodiment with layers 3,4 of insulation between the layers of the sheet of material 2 whereas Figure d shows an embodiment without the layers of insulation. It will be appreciated by those skilled in the art that all the embodiments of the invention can be made with or without the layers of insulation between the layers of the sheet of material 2. FIG. 2 *b* and *c* show prior art structures.

By taking very thin material 2, bending and or rolling this, it is possible to form a small compact edge 1 with significantly reduced losses as compared to conventional edging techniques. This can be improved further by the addition of a thin insulation material 3,4 interleaved with the thin material 2, not only does this prevent the surfaces from touching but the compression of the insulating material tends to improve its insulating properties. This edging material 1 can then be bonded to the top and bottom skins 5,6 by various means most suited to their environment; stainless steel is typically welded. The provision of end portions 11,12 in the shape of inverted 'top hats' or inverted 'V's 11*a*,12*a* can improve the seal. The edging material 1 can be produced in any length and joined at each end by a small length having no insulation, fusing of all layers together and forming an air-tight seal.

A typical problem of using any type of edge assembly is the sealing of the corners and this can be accommodated using the same techniques of bending and folding. A typical example is shown in FIG. 4 depicting a radiused rolled corner 40. FIG. 5 indicates what the original source material 50 would look like before folding. The material 50 has two extending portions 51,52 corresponding to the corner position (40 of FIG. 4). These portions 51,52 are folded and rolled as the edge piece 1 is assembled to form a radiused corner shape. Most corner shapes can be accommodated using these folding techniques. It is feasible that these folding techniques may have applications in other technologies.

The edge 1 can be made out of any thin material suitable for the temperatures and environment encountered. Any insulation 3,4 interleaved with the thin material can be applied by way of a coating prior to manipulation or forming and because the edge material 1 is made out of one continuous piece it means it can be completely sealed, enabling vacuums to be formed and kept should they be required. This process can also be performed in reverse where the thin material 2 can be deposited onto the insulation 3,4 or any combination of this. Where high temperature differences are to be maintained then part or all of the edge material 1 can be coated with a low emissivity material 13 to minimise radiative losses.

Tests have been conducted using 50-micron (0.002 inch) stainless steel with excellent results indicating insulation properties twice as good as existing designs. For a roll of approximately 10 mm×7 mm of 50 micron stainless steel with 0.5 mm ceramic paper insulation, typical losses have been found to be less than 1.4 watts/m length of edge at 200° C. temperature difference.

In a further test, a prototype panel was made incorporating an edge piece in accordance with the invention and tested for thermal losses. The panel was 270 mm×270 mm×9.7 mm, with ceramic fibre and aluminium foil as filler. The structure of the edge piece enabled the panel to be extremely light, with the top and bottom skins of the panel being 0.1 mm thick and the density of the panel being only 0.55 gms/cm$^3$. The edge piece was formed using 0.075 mm stainless steel sheet formed as a roll and incorporated around the panel. The panel was evacuated to a modest vacuum of no better than 0.1 mBar. When tested with a hot face temperature of 322° C. and a cold face temperature of 51° C., with an ambient temperature of 35° C., the panel demonstrated a thermal conductivity value of about 3.3 mW/mK.

It is believed that significant improvements can be made on these initial results.

An edge insulation piece in accordance with the invention has the advantage that it enables the conductive path between the faces of an insulation panel to be increased without increasing the distance between the panels. The invention has the additional advantage that it also enables the edge insulation piece on an insulation panel to allow for thermal expansion movements of the panel to be accommodated within the structure of the edge insulation piece itself.

Although the improvements are aimed primarily at Vacuum Super Insulation panels the invention can be applied to all other applications where a temperature difference is to be maintained or otherwise controlled and it can be applied to all shapes and sizes.

The invention claimed is:

1. An edge insulation piece for an insulation article, the edge insulation piece fitted between a first panel and a second panel of an insulation article, wherein said first panel and said second panel are opposite one another and parallel to one another, wherein a first perpendicular direction comprises a direction extending perpendicularly from said first panel to said second panel, wherein a second perpendicular direction comprises a direction extending perpendicularly from said second panel to said first panel, and wherein a planar direction comprises a direction that extends parallel with the plane of said first and second panels, the edge insulation piece comprising a sheet of material having two end portions, wherein a first end portion is joined to an outer side portion of the first panel and wherein a second end portion is joined to an outer side portion of the second panel, wherein the outer side portion of the first panel and the outer side portion of the second panel are perpendicular to the planar direction, wherein the sheet of material is shaped in a long conductive path from said first panel to said second panel within a small cross-sectional area between the two end portions, wherein the path of the sheet in cross-section comprises at least in part a spiral path wherein small portions of the sheet are folded to extend in said planar direction, at least one portion of the sheet is folded to extend in said first perpendicular direction, and at least one further portion of the sheet is folded to extend in said second perpendicular direction, the spiral path comprising portions of the sheet folded in at least the first and second perpendicular directions to form an inward spiral path in towards the centre of the edge insulation piece and the folding of the portions then being reversed to form an outward spiral path, portions of the sheet forming the outward spiral path being adjacent but not contacting portions of the sheet forming the inward spiral path and wherein the folded sheet does not contact the panels at any point other than at its end portions.

2. The edge insulation piece according to claim 1, wherein part or all of the surfaces of the sheet of material are coated with a low emissivity material.

3. The edge insulation piece according to claim 1, wherein part or all of the surfaces of the sheet of material are coated with a gas-impermeable layer.

4. The edge insulation piece according to claim 1, further comprising a layer of insulation material sandwiched between layers of the sheet of material to improve insulation between each layer and to prevent contact of any part of the sheet of material with adjacent layers.

5. The edge insulation piece according to claim 4, wherein the insulation is variable in thickness depending upon its relationship to hot and cold surfaces of the insulation article.

6. The edge insulation piece according to claim 1, wherein the edge insulation piece is formed by folding or rolling the sheet of material.

7. The edge insulation piece according to claim 6, wherein the sheet is folded to form two adjacent layers connected at a fold end.

8. The edge insulation piece according to claim 7, wherein the further folded sheet is folded or rolled to form the edge insulation piece.

9. The edge insulation piece according to claim 8, further comprising a layer of insulation material sandwiched between the two layers of the folded sheet.

10. The edge insulation piece according to claim 9, further comprising a further layer of insulation material positioned adjacent to one of the layers of the folded sheet and folded or rolled within the layers of the folded or rolled edge insulation piece.

11. The edge insulation piece according to claim 9, wherein the edge insulation piece has means to join it to separated parts of an article, the means to join the edge insulation piece to an article comprising extending end portions that can be attached to respective separated parts of such an article by welding or an adhesive.

12. The edge insulation piece according to claim 11, wherein the extending end portions are covered with an inverted 'V' or 'top hat' shaped sealing means.

13. The edge insulation piece according to claim 1, wherein the edge insulation piece comprises a corner portion, the edge insulation piece comprising a sheet of material with extending portions corresponding to the corner portion.

14. The edge insulation piece according to claim 13, wherein the extending portions are triangular in shape.

15. The edge insulation piece according to claim 13, wherein the corner portion comprises a radiused rolled corner.

16. A vacuum insulation panel comprising an edge insulation piece in accordance with claim 13.

17. An edge insulation piece for an insulation article, the edge insulation piece fitted between a first panel and a second panel of an insulation article, wherein said first panel and said second panel are opposite one another and parallel to one another, wherein a first perpendicular direction comprises a direction extending perpendicularly from said first panel to said second panel, wherein a second perpendicular direction comprises a direction extending perpendicularly from said second panel to said first panel, and wherein a planar direction comprises a direction that extends parallel with the plane of said first and second panels, the edge insulation piece comprising a sheet of material having two end portions, wherein a first end portion is joined to an outer side portion of the first panel and wherein a second end portion is joined to an outer side portion of the second panel, wherein the outer side portion of the first panel and the outer side portion of the second panel are perpendicular to the planar direction, wherein the sheet of material is shaped in a long conductive path from said first panel to said second panel within a small cross-sectional area between the two end portions, wherein the path of the sheet in cross-section comprises a path wherein a small portion of the sheet is folded to extend in said planar direction, a portion of the sheet is folded to extend in said first perpendicular direction, and a plurality of further portions of the sheet comprises a bellows arrangement, wherein the sheet is folded into a wave or zig-zag path arranged perpendicularly with respect to said planar direction and, wherein each further portion in said bellows arrangement comprises a portion folded to extend in said second perpendicular direction and a portion folded to extend back again in the first perpendicular direction, and wherein the folded sheet does not contact the panels at any point other than at its end portions.

18. The edge insulation piece according to claim 17, wherein part or all of the surfaces of the sheet of material are coated with a low emissivity material.

19. The edge insulation piece according to claim 17, further comprising a layer of insulation material sandwiched between layers of the sheet of material to improve insulation between each layer and to prevent contact of any part of the sheet of material with adjacent layers.

20. A vacuum insulation panel according to claim 17, wherein the edge insulation piece comprises a corner portion, the edge insulation piece comprising a sheet of material with extending portions corresponding to the corner portion.

* * * * *